July 22, 1924.
C. ANDERSON
1,502,287
SPLASH PREVENTER
Filed Feb. 29, 1924
3 Sheets-Sheet 3
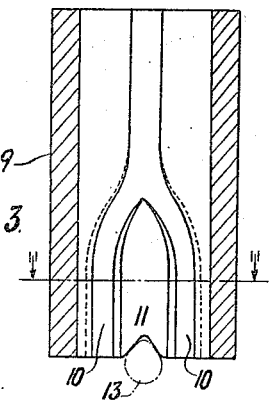
Fig. 3.
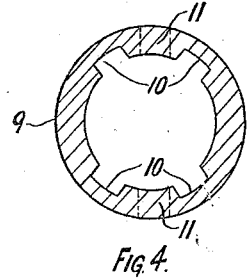
Fig. 4.
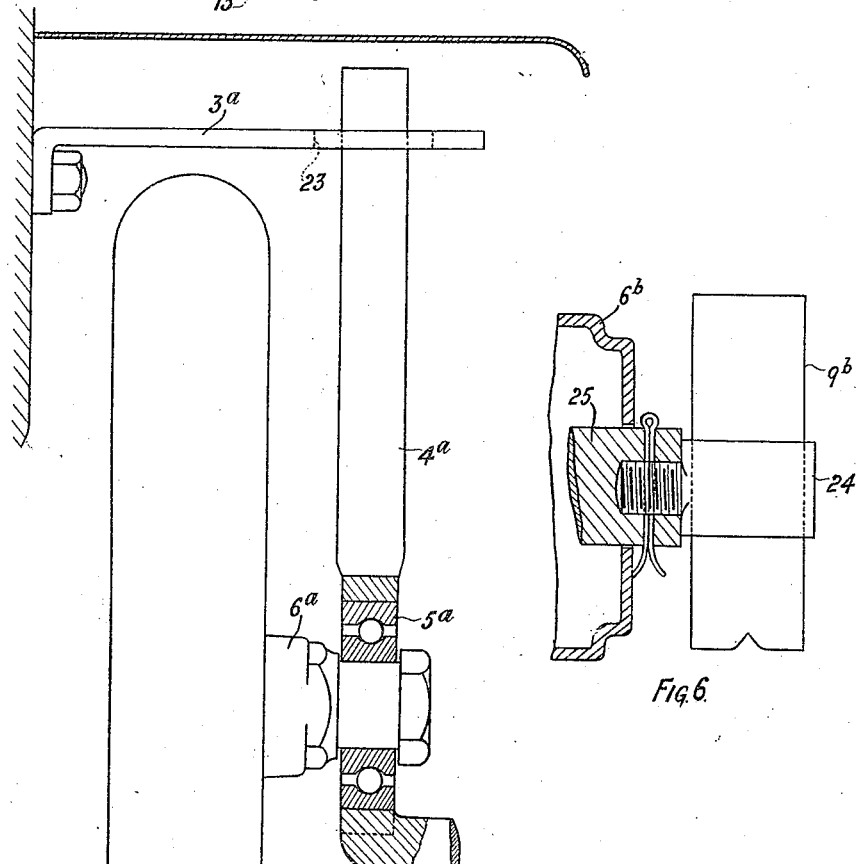
Fig. 5.
Fig. 6.

Patented July 22, 1924.

1,502,287

UNITED STATES PATENT OFFICE.

CHARLES ANDERSON, OF NEW YORK, N. Y.

SPLASH PREVENTER.

Application filed February 29, 1924. Serial No. 695,988.

*To all whom it may concern:*

Be it known that I, CHARLES ANDERSON, a subject of the King of Great Britain and Northern Ireland, and residing at New York city, New York, have invented certain new and useful Improvements in Splash Preventers, of which the following is a specification.

This invention relates to splash preventing attachments for motor vehicles of the type including a mat held extended over the field of splash by means connected to the vehicle.

Figure 1:
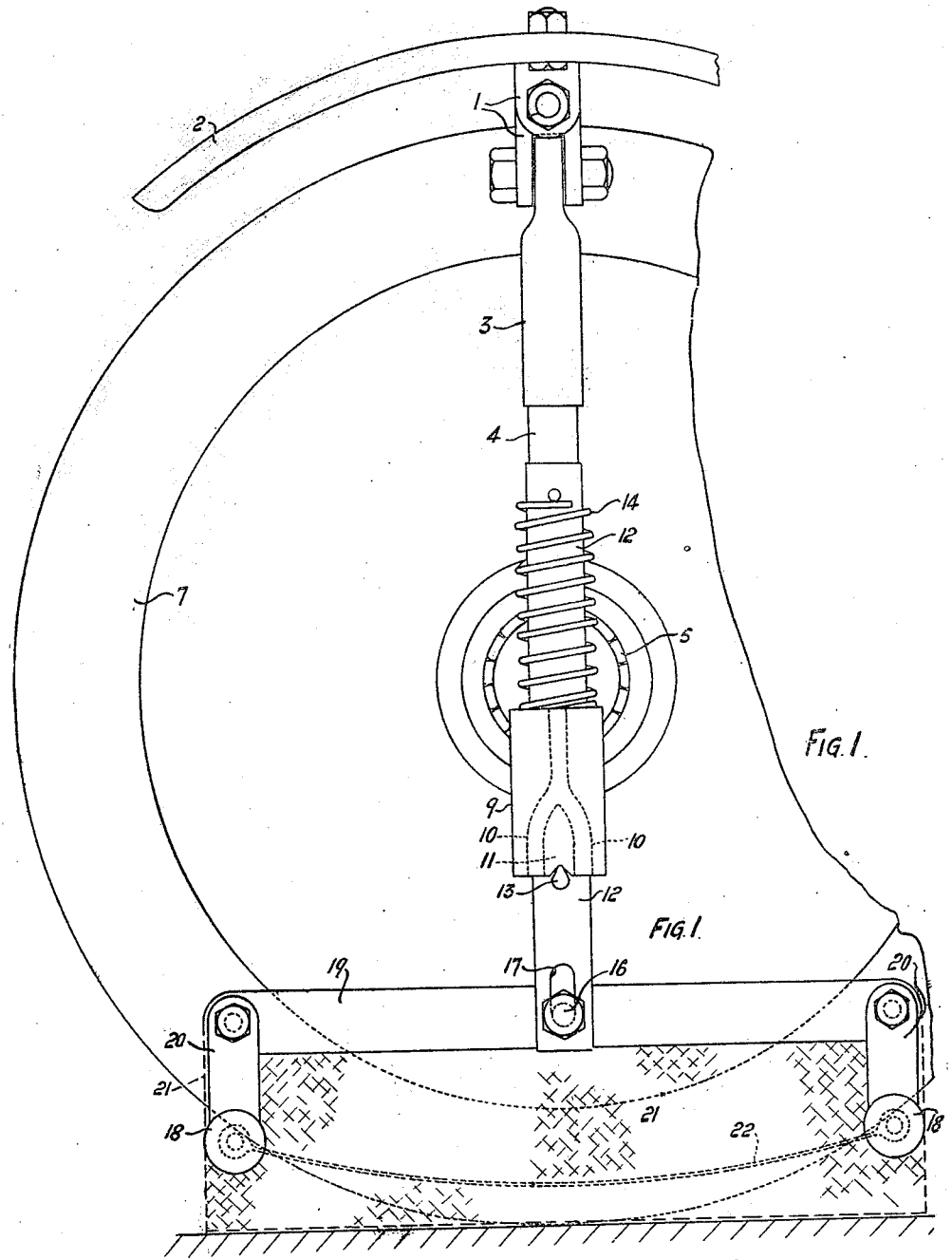
Figure 2:
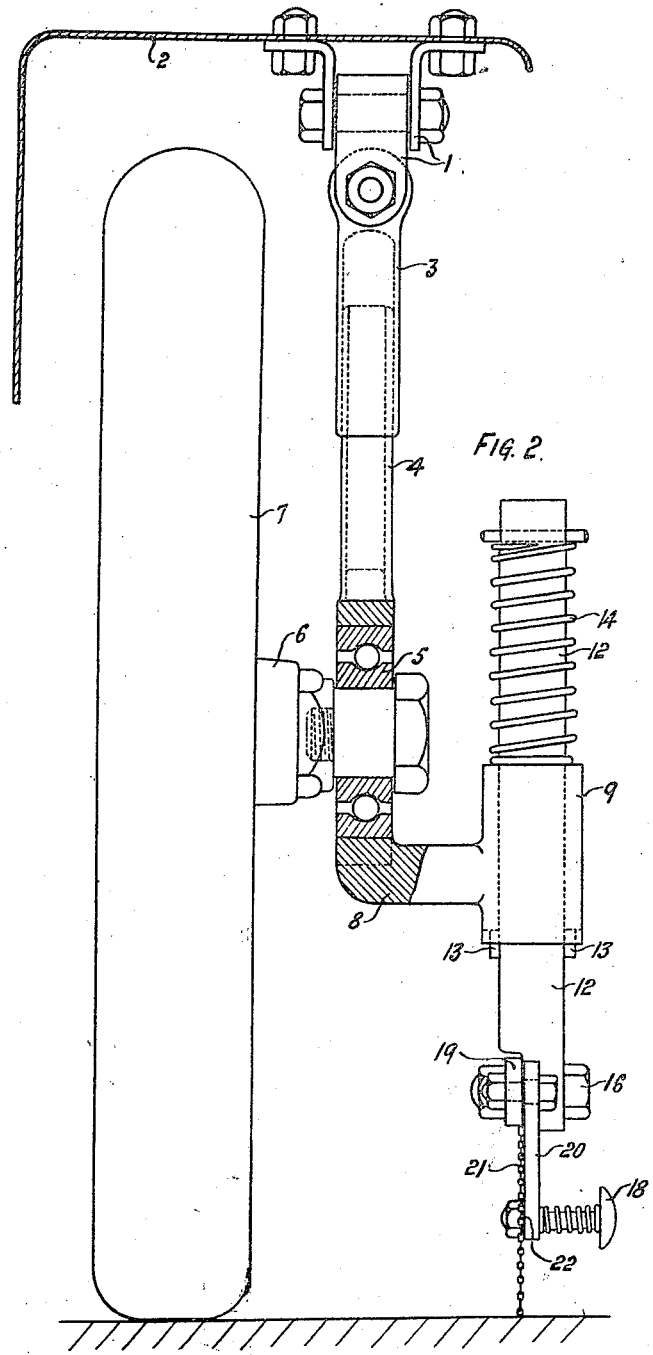

In the accompanying drawings a preferred construction of splash preventer according to the invention is illustrated in Figs. 1 to 4, Fig. 1 being a side elevation partly in section, Fig. 2 a front elevation, and Figs. 3 and 4 detail views of a socket member hereinafter referred to. Fig. 5 is an end elevation of a modification. Fig. 6 is an end elevation of a second modification.

The attachment shown in Figs. 1 to 4 includes a universal joint 1 one element of which is bolted to the mudguard 2. Depending from the other element of the universal joint is a tube 3 in telescopic relation with a tube 4 carried by a bearing 5 on the hub 6 of the vehicle wheel 7. An arm 8 formed on the tube 4 is provided with a socket 9 having spaced featherways 10 separated by notched stoppers 11 and accommodating a rod 12 feathered at 13, and urged by a spring 14. The feathers 13 are normally held by the spring 14 in engagement with the notches of the stoppers 11. The splash guard proper is adjustably carried on the rod 12 by a bolt 16 engaging a slot 17 in the rod 12. The guard is fitted with resilient pads 18 so disposed relatively to the axis of the rod 12 that, when the pads 18 engage an obstacle such as a kerb stone, the rod 12 is rocked on its axis whereby the feathers 13 are caused to vacate the notches in the stoppers 11 and to enter these featherways 10 towards which they are moved by the action of the obstacle, whereupon the spring 14 causes the rod 12 and therewith the splash guard proper to move upwardly into a position clear of the obstacle.

The splash guard proper includes a beam 19 to which are pivotally connected links 20 whereon are situated the pads 18 and on which is mounted a mat 21 of chain mail. To increase the rigidity of the mail, a wire 22 is threaded through the links of the mail.

According to a modification illustrated in Fig. 5, the socketed member for the reception of the feathered rod is constituted by a post $4^a$ carried by a bearing $5^a$ on the hub $6^a$ and restrained against rotation with the wheel by a bracket $3^a$ secured conveniently to the vehicle body and formed with an elongated slot 23 loosely accommodating the upper end of the post $4^a$. The arrangement is such that the post $4^a$ is free to slide vertically in the slot 23 or to rock from end to end of the slot 23.

According to the further modification shown in Fig. 6, designed for use in connection with front wheels, the socket $9^b$ is secured to an eye-bolt 24 which, in turn, is mounted on a non-rotary member 25 passing through a perforation in the hub cap $6^b$ and secured to the front stub axle (not shown).

What I claim is:—

In a splash preventing device for motor vehicles in combination with a hub member, a support attached to said hub member, a socket sustained by said support, said socket having spaced featherways separated by notched stoppers, a rod having feathers engaging said socket, a spring acting on said rod and serving normally to maintain said feathers in engagement with said stoppers, a splash guard proper adjustably carried on said rod, resilient pads fitted to said guard, said pads so disposed relatively to the axis of the rod that, when the pads engage an obstacle, the rod is rocked on its axis to cause the feathers to vacate the notches in the stoppers and to enter featherways in said socket permitting the spring to force the rod and therewith the guard to move upwardly clear of the obstacle.

In testimony whereof I have signed my name to this specification in the presence of two subscribing witnesses.

CHARLES ANDERSON.

Witnesses:
DAVID WEILD, Jr.,
J. A. VERNON.